United States Patent
Drucker

(10) Patent No.: US 8,730,833 B2
(45) Date of Patent: May 20, 2014

(54) COORDINATION OF CO-SPECTRUM USERS WITH WIRELESS BROADBAND NETWORKS

(75) Inventor: Elliot H. Drucker, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/642,904

(22) PCT Filed: May 9, 2012

(86) PCT No.: PCT/US2012/037029
§ 371 (c)(1),
(2), (4) Date: Oct. 23, 2012

(87) PCT Pub. No.: WO2013/169238
PCT Pub. Date: Nov. 14, 2013

(65) Prior Publication Data
US 2013/0301544 A1    Nov. 14, 2013

(51) Int. Cl.
*H04L 12/28*        (2006.01)
*H04J 1/16*         (2006.01)

(52) U.S. Cl.
USPC ............................. 370/252; 370/343; 370/430

(58) Field of Classification Search
USPC .......................................... 370/252, 343, 430
See application file for complete search history.

(56) References Cited

U.S. PATENT DOCUMENTS

| | | |
|---|---|---|
| 2007/0281710 A1 | 12/2007 | Bai et al. |
| 2010/0255780 A1 | 10/2010 | Rajagopal et al. |
| 2011/0170420 A1* | 7/2011 | Xi et al. .................... 370/241 |
| 2011/0299416 A1* | 12/2011 | Lotter et al. ............... 370/252 |

OTHER PUBLICATIONS

International Search Report and Written Opinion for PCT/US2012/037029 filed May 9, 2012, mailed Jul. 13, 2012.
"Connecting America: The National Broadband Plan," Chapter 5, Spectrum, Federal Communications Commission, Mar. 16, 2010, pp. 73-105.
"Changing Channels: TV Spectrum for Wireless Microphones and Wireless Broadband," American Association of Law Libraries, last updated Oct. 5, 2010, accessed at http://web.archive.org/web/20101111081532/http://www.aallnet.org/sis/mavsis/changing.htm, accessed on Dec. 17, 2013, pp. 1-8.

* cited by examiner

*Primary Examiner* — John Pezzlo
(74) *Attorney, Agent, or Firm* — Turk IP Law, LLC

(57) ABSTRACT

Technologies are presented for enabling a relatively low power, limited range communications system (or, alternatively, a terminal in a directional, point-to-point communications link), using native data communications services provided by an overlying wireless network, to automatically (or semi-automatically) negotiate with that network for use of specific portions of the frequency band or bands that are used in common by the low power device and the overlying network. Frequency management capabilities inherent to the wireless network may be utilized to automatically execute the resulting frequency use coordination. Through the coordination, the low power (or point-to-point) communications system may be protected from potentially excessive interference from the overlying network and/or user devices operating on that network (and vice-versa) while minimizing any impact on performance and capacity of the overlying network.

19 Claims, 7 Drawing Sheets

COORDINATION OF CO-SPECTRUM USERS WITH WIRELESS BROADBAND NETWORKS

BACKGROUND

Unless otherwise indicated herein, the materials described in this section are not prior art to the claims in this application and are not admitted to be prior art by inclusion in this section.

With the proliferation of various wireless technologies including wireless local area networks, wide area networks, cellular telephone systems, etc., demand for wireless spectrum suitable for wireless communications networks has grown substantially. The demand is expected to accelerate even more in the near future because of exponential growth in wireless broadband data network traffic. While government agencies charged with spectrum allocation and management such as the Federal Communications Commission (FCC) in the U.S. institute policies aimed at identifying additional spectrum that can be devoted to wireless networks, and in particular to broadband networks, implementation of these policies is generally constrained by factors like the range of available/practical frequencies.

Despite measures aimed at freeing useful spectrum, the demand for wireless bandwidth for broadband services is virtually certain to exceed spectrum being made available. One of the considerations in addressing this challenge is whether wireless networks, and in particular wireless broadband networks, could effectively operate on spectrum that is nominally assigned to other applications without significantly interfering with or otherwise disrupting those "primary" applications. Further consideration may be given to the practicality of such "secondary" operation of wireless broadband networks on spectrum that is shared not only with a "primary" application but with other "secondary" applications as well. Consideration may also be given to the practicality of broadband wireless networks operating as "primary" users of a particular block of spectrum with the caveat that some accommodation of secondary users is required.

Despite the enabling properties of network control of frequency use, spectrum flexibility, and cognitive radio systems, there remains a substantial impediment to wireless broadband use of spectrum on a co-primary or secondary basis. The challenge is that in many cases other primary or secondary applications may involve either low power transmissions intended for relatively short range communications or highly directional transmissions intended for point-to-point communications. Such communications links may be compromised due to severe interference from co-frequency transmissions from a nearby high power wireless network base station or from user devices being served by a wireless network base station. Those transmissions may be the result of the base station being unable to detect, for purposes of interference avoidance, the very low power or very directional transmissions from co-spectrum communications systems. Conversely, since the specific frequencies being employed by a given high power wireless network base station and the user devices it serves may change frequently and without warning, such transmissions may significantly interfere with the operations of co-spectrum low power or directional systems despite procedures (automatic or manual) whereby "locally unoccupied" channels are identified for use by those systems.

Thus, conventional systems do not allow relatively high power broadband networks of essentially ubiquitous coverage and the user devices operating therein, to coexist with the simultaneous operation of lower powered, short range communications devices and systems within that coverage and sharing the same general frequency bands. Such systems fail to manage the spectrum occupation of the network on a shared frequency band in a manner so that it does not interfere excessively with, or be excessively interred with by, various low power co-users of that band.

SUMMARY

The present disclosure generally describes technologies for coordinating co-spectrum users with wireless broadband networks.

According to some examples, a method for coordinating shared wireless spectrum use may include detecting activation of a wireless device configured to operate on a single fixed frequency, a fixed set of frequencies, a single frequency selected from a group of frequencies, or a set of frequencies selected from a group of sets of frequencies, where the single frequency or the set of frequencies is shared by the wireless device and a wireless network. The method may also include negotiating frequency use between the wireless device and the wireless network, and enabling the wireless device to operate using a frequency or frequencies allowed by the wireless network.

According to other examples, a computing device capable of coordinating shared wireless spectrum use with a wireless network may include a memory configured to store instructions, and a communication module configured to communicate wirelessly with the wireless network, and a processor coupled to the memory and the communication module. The processor may detect activation of a wireless device configured to operate on a single fixed frequency, a fixed set of frequencies, a single frequency selected from a group of frequencies, and a set of frequencies selected from a group of sets of frequencies, where the single frequency or the set of frequencies is shared by the wireless device and a wireless network. The processor may also negotiate frequency use between the wireless device and the wireless network, and enable the wireless device to operate using a frequency or frequencies allowed by the wireless network.

According to further examples, a computer-readable storage medium may have instructions stored thereon for coordinating shared wireless spectrum use. The instructions may include detecting activation of a wireless device configured to operate on a single fixed frequency, a fixed set of frequencies, a single frequency selected from a group of frequencies, or a set of frequencies selected from a group of sets of frequencies, where the single frequency or the set of frequencies is shared by the wireless device and a wireless network. The instructions may also include negotiating frequency use between the wireless device and the wireless network, and enabling the wireless device to operate using a frequency or frequencies allowed by the wireless network.

According to some examples, a wireless communication network coordinating shared wireless spectrum use with non-network wireless devices may include one or more base stations, each base station covering a predefined geographical area; a plurality of user equipment (UE) communicating with the network via at least one base station; and one or more radio resource controllers (RRCs). Each RRC may be configured to receive, from a UE associated with a non-network wireless device configured to operate on a single fixed frequency, a fixed set of frequencies, a single frequency selected from a group of frequencies, or a set of frequencies selected from a group of sets of frequencies, where the single frequency or the set of frequencies may be shared with the wireless network, an indication of activation or intended activation of the non-network wireless device. Each RRC may also negotiate frequency use between the UE and the wireless network, and notify the UE with one or more allowed frequencies or sets of frequencies for the non-network wireless device to operate upon.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
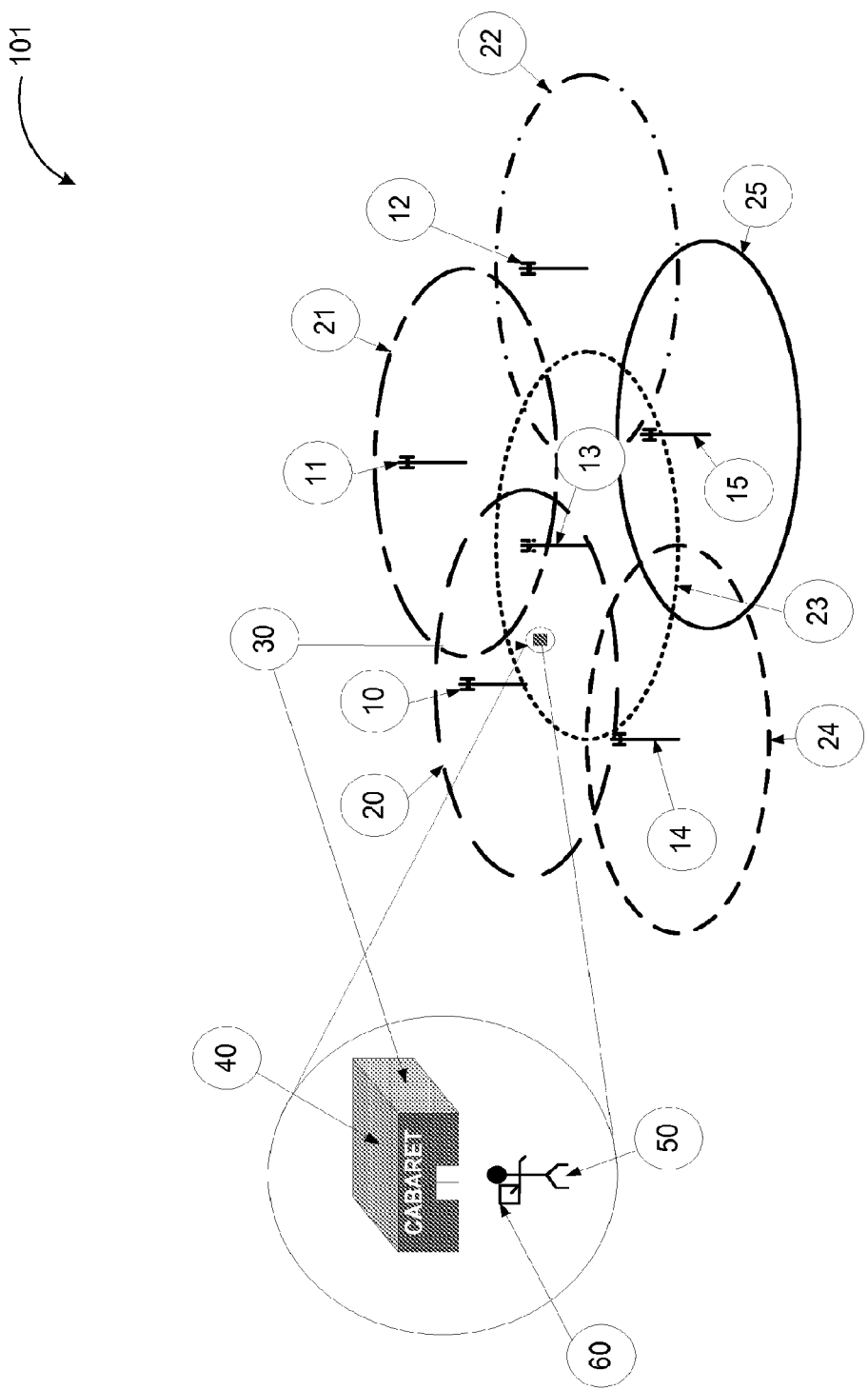
FIG. 1 illustrates an example geographical coverage distribution of a cellular telecommunication system, where shared spectrum coordination may be employed.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to coordination of co-spectrum users with wireless networks.

Briefly stated, technologies are presented for enabling a relatively low power, limited range communications system (or, alternatively, a terminal in a directional, point-to-point communications link), using native data communications services provided by an overlying wireless data network, to automatically (or semi-automatically) negotiate with that network for use of specific portions of the frequency band or bands that are used in common by the low power device and the overlying network. Frequency management capabilities inherent to the wireless network may be utilized to configure frequency use by the network so as to accommodate the resulting frequency coordination. Through the coordination management, the low power (or point-to-point) communications system may be protected from potentially excessive interference from the overlying network and/or user devices operating on that network (and vice-versa) while minimizing any resulting impact on performance and capacity of the overlying network.

It will be understood by those within the art that operation of wireless devices generally involves the use of modulated radio signals, and therefore the use of radio frequency (RF) "channels" of non-zero bandwidth. Accordingly, the term "on a frequency" as used herein with respect to the operation of a wireless device should be interpreted to mean operation on a specific portion of RF spectrum centered on or otherwise related to that frequency. Likewise, in discussion of measures taken by the wireless network to accommodate operation of a wireless device "on a frequency" it is to be understood that such accommodation will take into account the bandwidth occupied by such operation, and may include accommodation of any required additional guard band.

It will be understood by those within the art that various legal and/or regulatory factors may govern use of spectrum shared by a wireless network and one or more wireless devices whose nominal operation is unrelated to the wireless network (i.e. "non-network wireless devices." These factors may include, but are not limited to, laws and/or governmental regulations concerning spectrum use, terms of licensing of spectrum use, contracts or agreements between operators of the wireless network and the non-network wireless device, and conventions established by industry groups or other entities. In negotiating with a non-network wireless device for use of shared spectrum, as set forth herein, the wireless network may need to consider such factors. For example, if the operation of the non-network wireless device is legally or otherwise deemed secondary to that of the wireless network in the shared spectrum then the wireless device may be required to allow operation of the wireless device only if such operation does not materially impact performance or capacity of the wireless network or if such impacts can be sufficiently mitigated with reasonable accommodations on the part of the network. On the other hand, if operation of the wireless network is legally or otherwise deemed secondary to that of the non-network wireless device in the shared spectrum then the wireless network may be required to allow operation of the wireless device upon request, and further to make any accommodations necessary in operation of the wireless network so as to not materially impact operation of the wireless device. Accordingly, in the discussions herein regarding negotiations for frequency use between a wireless network and a non-network wireless device, it should be understood that such negotiations may take into account the legal or regulatory factors discussed above. Similarly, where the terms "allow", "allowed" and/or "allowing" are used herein to denote an action on the part of the wireless network related to frequency use by a non-network wireless device, it is to be understood that such action may be compelled by the legal or regulatory factors discussed above.

Throughout this specification, references are made to fixed frequencies, groups of frequencies, etc. negotiated between the wireless device and the wireless network. Frequencies on which wireless devices may operate according to some embodiments may be summarized in following example scenarios:

A wireless device may only be capable of operating on a single, fixed frequency. In this case, the network may or may not "allow" the wireless device to operate on that frequency.

A wireless device may operate on a single frequency at any given time, but may be "frequency agile." That is, it may be capable of operating on a frequency selected from a plurality of frequencies, which may be specific designated frequencies or any frequency within one or more ranges of frequencies. In this case the network may "allow" operation of the wireless device in one of two ways: it may "allow" the wireless device to operate on one specific frequency from the set of frequencies on which the wireless device is capable of operating; or it may designate a plurality of frequencies, or one or more ranges of frequencies (in each case drawn from the "capable" set of the wireless device) on which the wireless device is "allowed" to operate. In the latter case, the wireless device may then select a specific frequency for its operation from the "allowed" set.

Operation of the wireless device may require the simultaneous use of a plurality of frequencies (e.g. separate frequencies for each direction in a point-to-point communication system), and the device may only be capable of operation on a fixed set of frequencies (e.g. one frequency for each direction in a point-to-point communication system). In this case, the network may or may not "allow" the wireless device to operate on that set of frequencies.

Operation of the wireless device may be similar to the above described one except that the wireless device may be frequency agile, capable of operating on a frequency set selected from a plurality of possible frequency sets, which may include specific designated frequencies or any frequencies within one or more ranges of frequencies. In this case the network may "allow" operation of the wireless device in manners comparable to those of the second example scenario.

FIG. 1 illustrates an example geographical coverage distribution of a cellular telecommunication system, where shared spectrum coordination may be employed, arranged in accordance with at least some embodiments described herein.

As discussed above, the demand for proliferating wireless communication services exceeds available and/or practical frequency spectrum. For example, the range of frequencies that can practically be used for mobile communications networks, including broadband networks, is limited to that between approximately 450 MHz and 3.0 GHz. Below around 450 MHz the size of antennas of reasonable efficiency grows to a point that they become impractical for some mobile device applications. Furthermore, RF propagation characteristics of lower frequencies makes intensive channel reuse, which is needed to support high spectrum efficiency in urban areas, much more difficult to manage. RF propagation for frequencies above about 3.0 GHz is highly constrained to line-of-sight environments, which is contrary to the general characteristics of mobile network operation.

Another factor constraining additional spectrum is that a majority, if not all, of the range of practical frequencies not already allocated to mobile services is already in use by other incumbent applications and users. In some cases spectrum can be freed up for mobile broadband use because incumbent applications do not require as much spectrum as they are currently allocated. In the United States, for example, advances in television broadcast technology (mainly to digital formats) and growing use of cable and other media for television signal transmission allowed the FCC to recently reallocate substantial amounts of spectrum in the 700 MHz band from broadcast TV to wireless network applications. In other cases, for example 2 GHz point-to-point microwave links, incumbent applications have been moved to different spectrum bands, typically those above 3 GHz, freeing up spectrum that is suitable for mobile networks.

One approach in dealing with the congested spectrum is allowing portions of the frequency spectrum to be shared among different services. Several factors suggest that such operation of ubiquitous coverage broadband networks on spectrum shared with other users may be practical. Such networks typically operate with centralized control of spectrum utilization. That is, the base stations and user devices that constitute the RF transmitting elements of the network operate on frequencies that are assigned, either statically or dynamically, under network control. Thus, regardless of whether the wireless broadband network is a primary or secondary user of a particular spectrum block, the task of assuring non-interference with the other (primary or secondary) user(s) of that spectrum block may be borne exclusively by the broadband network.

Another factor enabling spectrum sharing by state-of-the-art broadband networks is their use of orthogonal frequency division multiplexing (OFDM) in the air interface, which is highly adaptable to use of spectrum on an as-available basis. That is, on at least a cell-by-cell basis, OFDM network types such as Long Term Evolution (LTE) and IEEE 802.16 (WiMAX) can assign subcarrier groups with small enough frequency "granularity" to take advantage of spectrum that is locally unused by other primary or secondary applications. Furthermore, in cases where co-spectral applications employ relatively narrow bandwidth transmissions, OFDM networks as co-primary or secondary users may be able to utilize a substantial amount of spectrum by "notching out" the frequencies occupied locally by other primary or other secondary users.

A further factor in broadband networks being able to use spectrum on a shared basis is the growing practicality of cognitive radio technology. In its purest form, a cognitive radio is one in which the entire receiver and transmitter systems, including RF and IF filtering as well as baseband processing, are realized in software. Cognitive capabilities in base station and user device radio systems may enhance secondary use mainly by expanding the frequency range over which these systems can operate, providing a larger target for secondary use spectrum. Cognitive receiver systems in the base station may also assist networks in passively sensing activity by primary users so as to establish frequencies the network and user devices operating therein have to avoid.

The challenge is that in many cases other primary or secondary applications may involve either low power transmissions intended for relatively short range communications or highly directional transmissions intended for point-to-point communications. The limitations of base station co-usage sensing may be exemplified by the practical example of the FCC's rulemaking in the U.S. aimed at allowing secondary use of broadcast television channels in geographic areas where they are currently not being utilized. These so-called "white spaces" represent a significant opportunity for secondary use by broadband networks because they provide substantial bandwidth, much of which is in spectrum that is ideal for mobile data applications, and because coordination to avoid interference with the primary application, broadcast television channels, is simple and straightforward. A challenge is, however, that certain other secondary users utilize white spaces, for example wireless microphone systems. The case of wireless microphones is used herein as an example because, as an existing user of white space spectrum, it has well defined operational characteristics that enhance the disclosure of example embodiments. Embodiments are, however, not limited to wireless microphones and/or broadband networks. Coordination of co-spectrum users may be implemented with any wireless device and an overlying network using the principles described herein.

Wireless microphones are used in many applications, familiarly in settings such as theaters, nightclubs, churches, and lecture halls. The nature of these enterprises makes proper functionality of wireless microphones of substantial importance, so that interference from an overlying broadband network, or from nearby user devices operating on such a network, would be intolerable. Diagram 101 of FIG. 1 illustrates, for purposes of simplified discussion, the case where a particular spectrum block is used by both a ubiquitous coverage wireless broadband network and a wireless microphone system. Wireless microphone systems are but one of many types of communications systems whose sharing of spectrum with ubiquitous coverage broadband networks may be implemented through example embodiments.

In diagram 101, a geographical portion of a cellular telecommunications network that provides essentially ubiquitous service over a region is shown. The service may be provided through a number of network base transceiver stations (BTSs), also commonly referred to as "cell sites" or "cell towers". Six example BTSs 10, 11, 12, 13, 14, and 15 are shown in diagram 101. Each BTS may provide service coverage over a "cell," and collectively the cells within a network may provide ubiquitous coverage over the network's service area. The six cells 20, 21, 22, 23, 24, 25 are associated with the respective BTSs 10, 11, 12, 13, 14, and 15. The simplified depiction of wireless networks forgoes some of the complexities of such networks such as non-uniform coverage by the cells, overlapping patterns of the cells, and distribution of BTSs, because these aspects are not germane to the core of the present discussion.

Cabaret 30 represents a location, where an example wireless microphone system 40 may operate and where incident RF signal levels from either of two BTSs (10 or 13) may be of sufficient strength that they provide unacceptable levels of interference to the wireless microphone system 40 operating on the same frequency within the cabaret building.

In the example scenario of diagram 101, a person 50 uses a mobile wireless device—i.e. a UE such as a cellular telephone 60—that is operating on the wireless network while in close proximity to (or potentially inside) the cabaret 30. The proximity may be such that one or both of the following conditions may exist: RF signals transmitted by the UE 60 may excessively interfere with co-frequency operation of the wireless microphone system 40 and/or RF signals transmitted by the wireless microphone system 40 may excessively interfere with signal reception by the UE 60.

The potential for the different types of interference may exist if the wireless network BTSs and/or UEs operating on that network, and the wireless microphone system 40 are allowed by license or regulation to transmit on the same frequencies. At the same time, however, it may be desirable to allow the wireless network and its UEs to operate on the same frequency bands used by wireless microphones. This is because use of wireless microphones tends to be in small and generally widely spaced locations. Elsewhere, operation of the wireless network and its UEs on the same frequencies allocated to wireless microphones may not result in mutual interference.

Furthermore, operation of a given wireless microphone system may generally employ an RF bandwidth that is a small fraction of the spectrum in the band allocated to such use. Thus, in areas where mutual interference is possible, the wireless network and its UEs may still be able to operate, without mutual interference, on portions of the band not used by the nearby wireless microphone systems. The coordination of spectrum usage between the network and the wireless microphone system 40 may take the form of the wireless network not using (for either uplink or downlink channels) the frequencies used by the wireless microphone system 40 in BTSs 10 and 13 while the wireless microphone system is in use. Alternatively, if the wireless microphone system 40 is frequency agile, it may be directed to use frequencies that are not in use in BTS 10 or 13.

Figure 2:
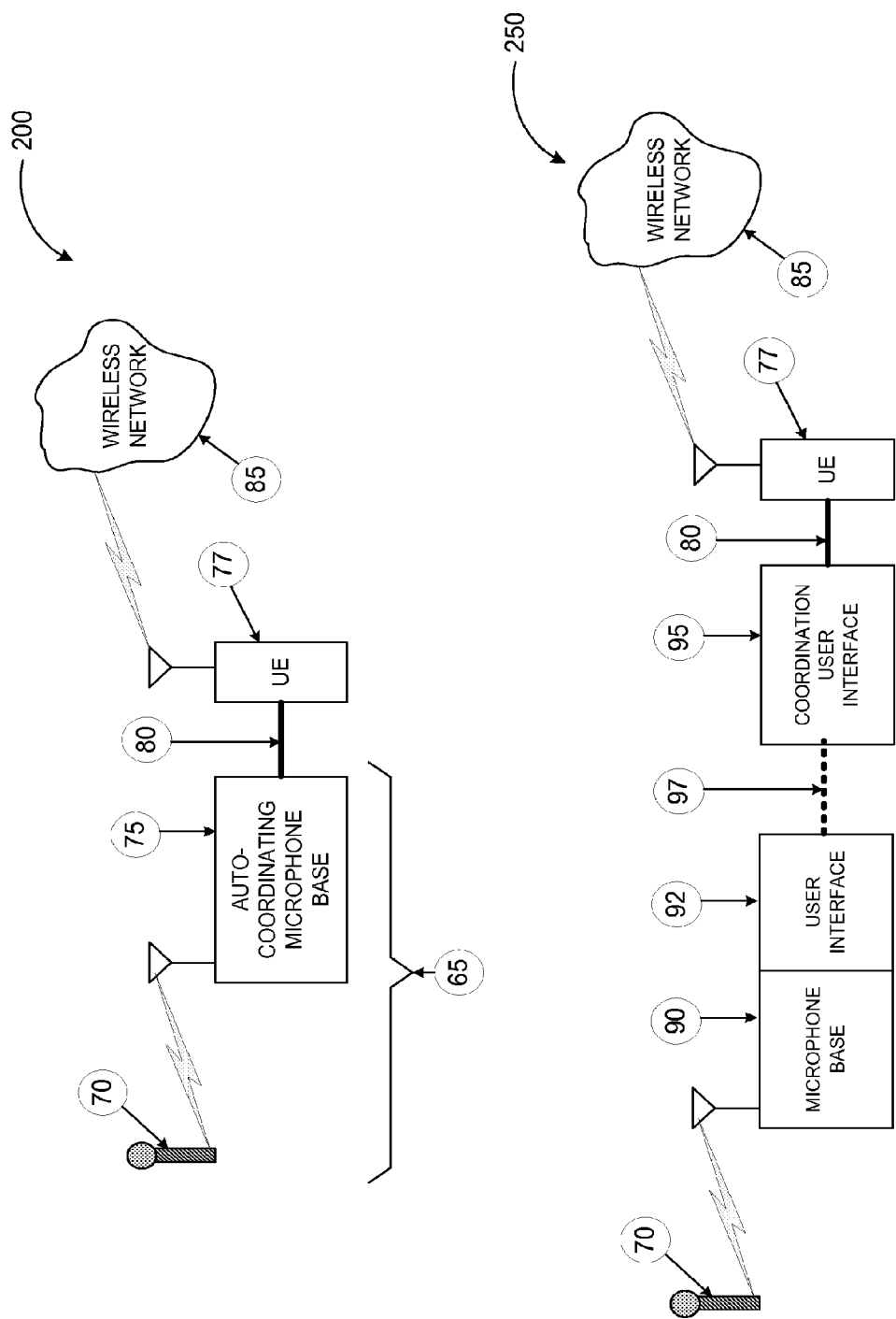
FIG. 2 illustrates two example configurations for a wireless microphone employing shared spectrum coordination.

FIG. 2 illustrates two example configurations for a wireless microphone employing shared spectrum coordination, arranged in accordance with at least some embodiments described herein.

Diagram 200 of FIG. 2 shows a wireless microphone system 65 comprised of at least one microphone 70 and a microphone base station 75. In this example scenario, the microphone base station 75 is "auto-coordinating" because it has facilities that allow connection 80 to a UE 77. The UE 77 may be a standard data connection device, of a type commonly available in the commercial marketplace, which is configured so as to operate in accordance with requirements of the overlying wireless network 85. The connection 80 may be of a modest length so that the UE 77 resides in reasonably close proximity to the wireless microphone system. In some examples, the UE 77 may also be embedded in the microphone base station 75 or in the wireless microphone 70.

When the wireless microphone 70 is not in use, no action may be needed on the part of the microphone base station 75 or the UE 77. If the operator of the wireless microphone system wishes to use it (indicated, for example, by turning an on/off switch on the microphone base station 75 from the OFF position to the ON position), the microphone base station 75 may communicate, via the connection 80, with the UE 77. This communication may prompt the UE 77 to request a service access on the overlying network 85, the purpose of which may be to negotiate frequency coordination with a controller within or associated with the network.

While diagram 200 shows a microphone system with a base station capable of communicating with the overlying network (through the UE 77), some low power communications devices may lack the facilities (hardware and/or software) needed to connect to a remote UE so as to enable the spectrum sharing. Diagram 250 illustrates an alternative approach, where the wireless microphone system includes at least one wireless microphone 70 and a "conventional" microphone base 90 that has a user interface 92 through which the operation of the system can be controlled. A frequency coordination system including a coordination user interface 95 connected through a connection 80 to a UE 77 may be located in reasonably close proximity to the wireless microphone system. Alternatively, the coordination user interface 95 and the UE 77 may be integrated, and may even be a conventional personal computer equipped with an appropriate modem UE and executing software that provides the required user interface.

In order to facilitate frequency coordination, the operator of the wireless microphone system may use the frequency coordination system, through the coordination user interface 95 to negotiate coordination with the overlying wireless network 85. If successful, that negotiation may provide to the operator, through the coordination user interface 95, information that the operator can then use to control the wireless microphone system, through its user interface 92, in a manner that may be coordinated with the wireless network. The manual control is insinuated with dashed line 97 in diagram 250. For example, the "control" may include simply allowing the wireless microphone system to be used on its fixed channel over a designated time interval. If the wireless microphone system is frequency agile, a designated channel may also be included.

Figure 3:
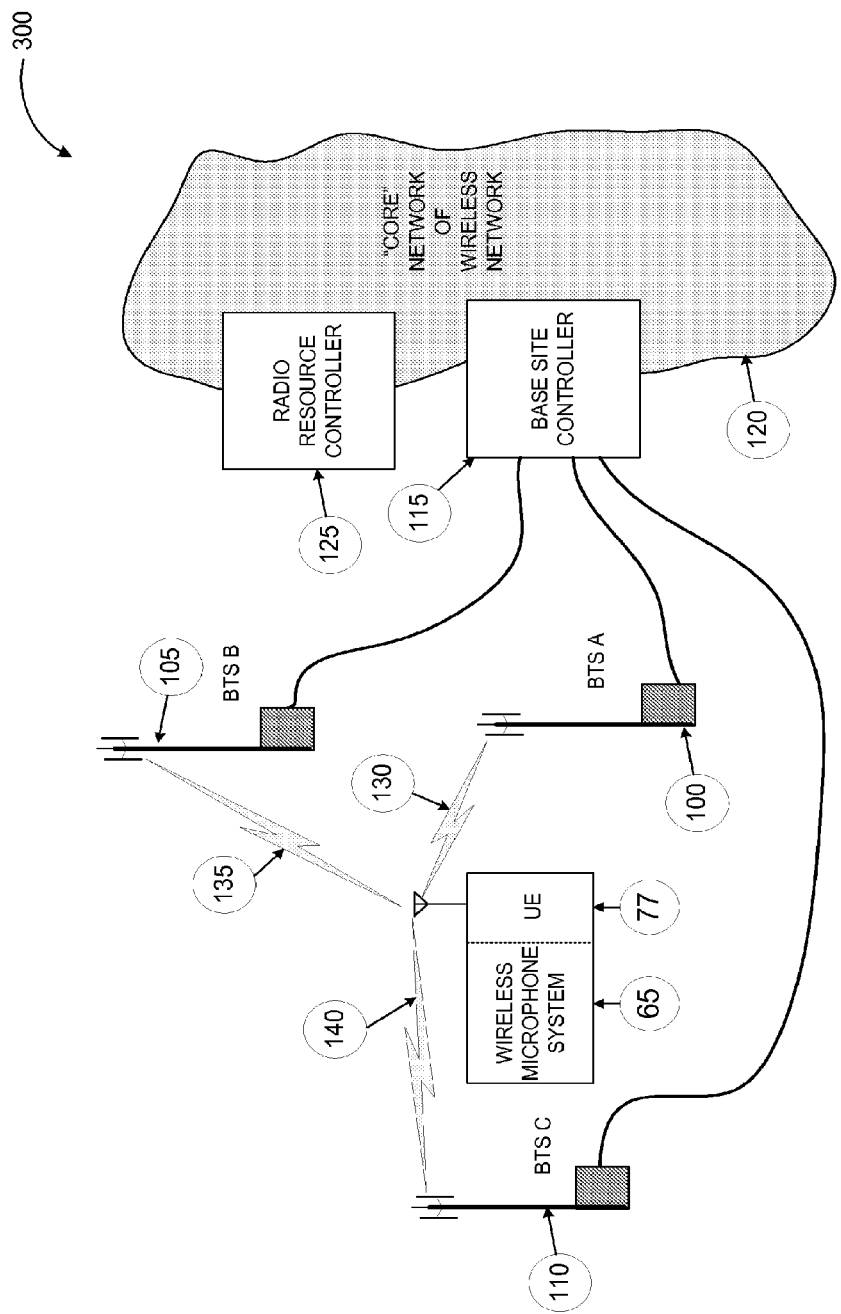
FIG. 3 illustrates shared spectrum coordination between a wireless device (a wireless microphone) and a wireless network through the use of a UE.

FIG. 3 illustrates shared spectrum coordination between a wireless device (a wireless microphone) and a wireless network through the use of user equipment (UE), arranged in accordance with at least some embodiments described herein.

Diagram 300 of FIG. 3 schematically depicts a UE-equipped wireless microphone system 65 as it functions within the overlying wireless network. The precise nature of the functionality may be determined by the specific air interface technology used in the overlying wireless network, and appropriate variations may thus apply to the process described herein.

The wireless microphone system 65 and the UE 77 connected to it may be located within the general coverage area of the overlying wireless network. Nearby (in terms of RF path loss) may exist a number of BTSs of the wireless network. For illustration purposes three such nearby BTSs, designated BTS A 100, BTS B 105, and BTS C 110 are shown in diagram 300. As is typically the case in wireless networks, the three BTSs may each be connected through dedicated backhaul links to a common Base Site Controller (BSC) 115 that is in turn connected to other "core" elements of the wireless network through a "core network" 120. One of these core elements may be a Radio Resource Controller (RRC) 125, which may at least in part manage frequency assignment and usage in the various BTSs of the wireless network so as to provide required traffic carrying capacities with a minimum of interference. The RRC 125 may be collocated with or even integrated into the BSC 115.

When the operator of the wireless microphone system 65 decides to use it, causing it to transmit and receive either on a fixed RF channel or on one of several channels on which it is capable of operation within a designated band, that channel may occupy frequencies which might also be used by the overlying wireless network.

In order to put the wireless microphone system 65 into operation, the user may, for example, turn a switch to the "ON" position, or make some similar manipulation of the system's user interface. Before the wireless microphone system can transmit in operational fashion (i.e. wireless microphone 70 transmits signals to base station 75), it may first coordinate the use of its fixed frequency or frequency set, or a negotiated frequency or frequency set, with the overlying wireless network. The UE 77, which may have been operating in an idle mode heretofore, may access the overlying wireless network with a request for frequency coordination service. The access may entail both conventional access protocols (as defined for the air interface technology in use) and specialized protocols that support the frequency coordination negotiations.

In accordance with typical access protocols, the UE 77 may initially transmit its access request on a reverse (uplink) control channel associated with the BTS that is transmitting the strongest forward (downlink) pilot or control channel that it can receive. For example, the transmission may be on the reverse control channel associated with BTS A 100. In the initial access transmission and/or in subsequent exchanges of data with BTS A 100, the wireless microphone system 65 may provide information that might be required for frequency coordination. For example, the information may include which frequency or frequencies the wireless microphone system is capable of operating on and the power level(s) at which it may transmit.

In order to properly coordinate frequency use, the wireless network may need to determine which BTSs may impact or be impacted by operation of the wireless microphone system 65. Thus, as part of the negotiation process, and again through generally standard protocols, the wireless network may instruct the UE 77 to measure and report the received signal levels it observes on forward channels of not only the "originating" BTS A 100 but also of "neighboring" BTSs (e.g. BTS B 105 and BTS C 110). The UE 77 may comply by making measurements 130, 135, and 140 and reporting the results, using procedures and protocols as standardized for the air interface technology in use.

Information from the processes described above may be passed from BTS A 100, through the BSC 115 to the RRC 125. The RRC 125 may make a determination as to what accommodation can be made in spectrum use in BTS A 100, BTS B 105, and BTS C 110. If the wireless microphone system 65 is frequency agile, it may also determine which frequency or frequencies to assign for use by the wireless microphone system 65 so as to minimize impact on operation of the wireless network.

It should be noted that frequency coordination decisions made by the RRC 125 may be affected by the legal, contractual, or regulatory relationship between the wireless microphone system 65 and the overlying wireless network. For example, if the wireless microphone system is licensed as a "primary" user of the shared band, and the overlying wireless network is licensed as a "secondary" user, then the RRC 125 may be compelled to "free up" the spectrum used by the wireless microphone system 65 in surrounding BTSs so as to assure absence of excessive interference. On the other hand, if the wireless microphone system 65 is licensed as a "secondary" user and the overlying wireless network is licensed as a "primary" user, the RRC 125 may deny use of any frequency to the wireless microphone system if that frequency is needed to meet the traffic demands of the wireless network.

In one example scenario, the wireless microphone system 65 may operate on a fixed frequency defining a channel that occupies a certain small portion of the spectrum band used for forward (downlink) channels in the wireless network, and the RRC 125 may decide to accommodate its operation. Further, measurements made and reported by the UE 77 may indicate: (1) even reduced level co-frequency transmissions from BTS A 100 could interfere with the wireless microphone system; (2) high level co-frequency transmissions from BTS B 105 could interfere with the wireless microphone system, however transmissions at reduced levels would be acceptable; and (3) path loss from BTS C 110 is sufficient to assure that even high level co-frequency transmissions would not interfere with the wireless microphone.

Under the conditions described above, the wireless network may convey, through BTS A 100 and the UE 77 to the wireless microphone system 65, an indication that the wireless microphone system 65 may begin operating. Because all processes heretofore described are machine-to-machine, and because the amount of information to be transmitted is modest, the elapsed time for the wireless microphone system 65 to obtain frequency coordination from the overlying wireless network may be less than a few seconds.

It may be presumed that the wireless microphone system 65 is typically not in continuous use, so that when it ceases transmitting the portion of spectrum that has been "cleared" for it in the operation of the overlying wireless network can be restored to full service. In order to allow restoration of unrestricted network operations on the previously "cleared" frequencies, the wireless network may be made aware of termination of the wireless microphone's operation. In some examples, the wireless network may provide an indication to the wireless microphone system 65, when coordination is accomplished, that it can transmit on the specified frequency or frequencies for a predefined period (e.g. five minutes). At the end of that period, and unless the coordination is "refreshed," the wireless microphone system 65 may no longer be protected against interference from the wireless network, and the wireless microphone system 65 may be required to cease transmission so at to protect the wireless network against interference from the wireless microphone.

Refreshment of the coordination may be accomplished by the wireless microphone system 65, through the UE 77, requesting (or, if appropriate, demanding) such refreshment through the use of suitable wireless network protocols. The RRC 125 may then renew the frequency coordination for an additional time period, and a message to that effect may be sent, through the UE 77, to the wireless microphone system 65. Using this scheme, the frequency coordination may remain in effect as long as operation of the wireless microphone system 65 is needed, and may terminate shortly thereafter without requiring a positive indication from the wireless microphone system 65 that it has been turned off.

In another example, the original frequency coordination may be assumed to remain in place for a greater period, perhaps several hours (the duration of which may be established as part of the frequency coordination negotiation between the wireless microphone system and the wireless network), or until it is ended through the use of a "termination" message sent by the wireless microphone system 65 through UE 77.

Figure 4:
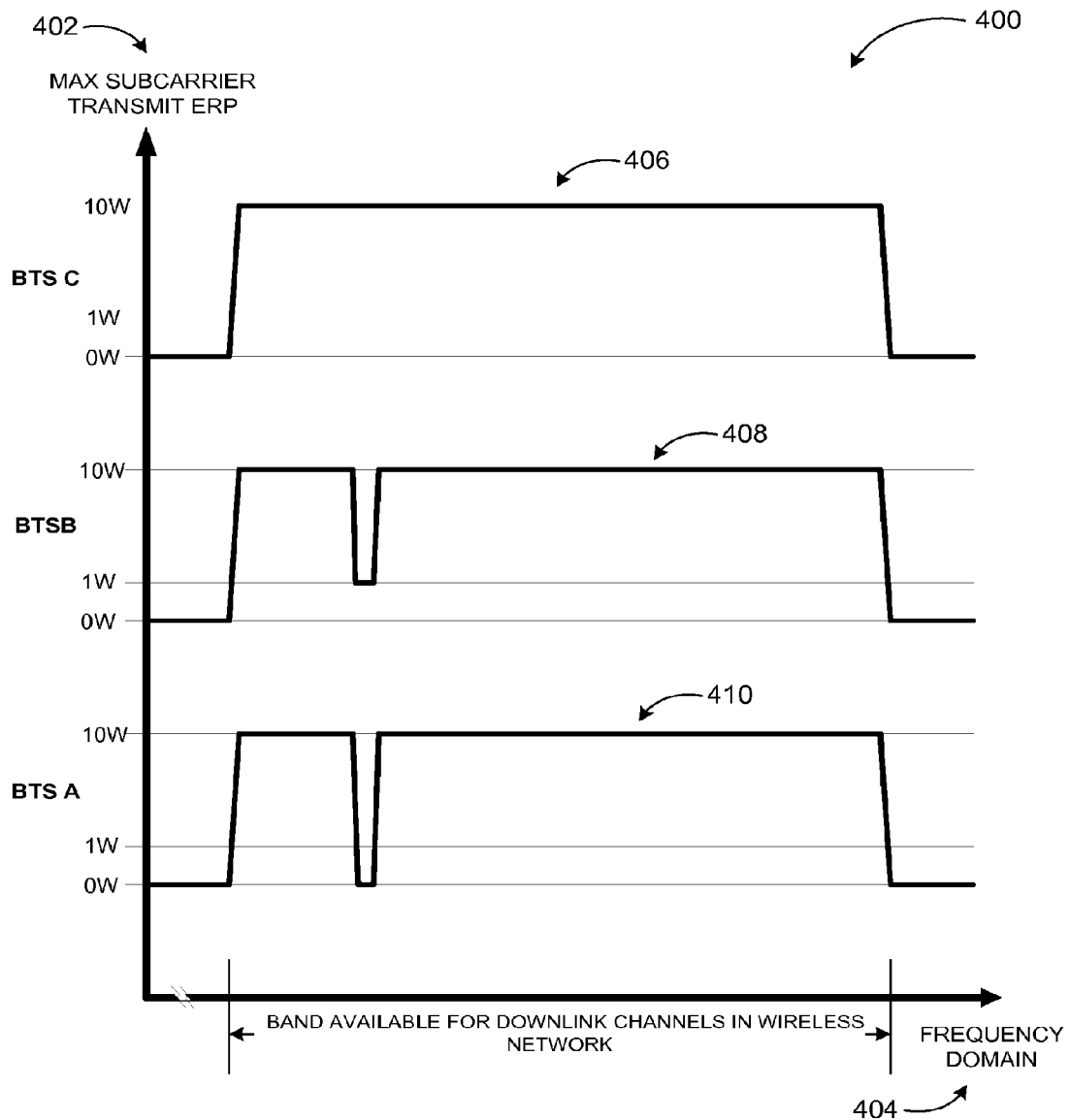
FIG. 4 illustrates spectrum clearing in a system employing shared spectrum coordination.

FIG. 4 illustrates spectrum clearing in a system employing shared spectrum coordination, arranged in accordance with at least some embodiments described herein.

In a system according to embodiments, the "clearing" of spectrum usage by the overlying wireless network may be limited to a few BTSs, minimizing an impact on network capacity. Diagram 400 illustrates a nature of this spectrum clearing. In diagram 400, the transmit power levels of the three examples BTSs (BTS A, BTS B, and BTS C) of FIG. 3 are shown across frequency domain (404) and maximum subcarrier transmit effective radiate power (ERP) 402 axes.

The frequency domain plots 410, 408, and 406 for the BTS A, BTS B, and BTS C, respectively, represent operations of the BTSs allowed by the RRC 125 depending upon traffic loading and intra-network interference considerations. In frequency domain plot 410, there is a "notch" of relatively narrow bandwidth in which BTS A is not allowed to transmit in order to protect the wireless microphone system 65 from interference. The notch, including perhaps a relatively small guard band, may correspond to the channel on which the wireless microphone system 65 transmits. In frequency domain plot 408 there is a similar notch, except that within its bandwidth BTS B can transmit but at a significantly reduced power level which the network has determined may not cause excessive interference to the wireless microphone system. Thus, spectrum within this protected band may be used in BTS B for downlink service to UEs that can be effectively served at this lower power level. In frequency domain plot 406 for BTS C, no reduction in transmit power level is needed to protect the wireless microphone system 65 from interference.

In a system according to some embodiments, it may be necessary that specific frequencies used for control channels or other special purposes in the wireless network not be subject to shared use depending upon control channel operational characteristics of the wireless network. In some cases, a particular spectrum band used by a wireless network and shared with other users may be in addition to a different spectrum band that is used exclusively (in a given geographic area) by that wireless network. In such cases, the shared spectrum may be used by the wireless network primarily when and where its traffic levels exceed the capacity of channels operating within the network's "dedicated" spectrum.

Embodiments may be implemented by wireless network operators, infrastructure providers, and/or UE manufacturers. Potential spectrum sharing with wireless broadband networks is not limited to wireless microphone systems, which are cited herein for purposes of illustration. Many other types of low power or point-to-point communications systems may take advantage of spectrum sharing using the principles described herein. One example is wireless local area networks (WLANs) such as those that employ IEEE 802.11 standards. A particular WLAN may have little if any traffic most of the time, and may, therefore, operate successfully on one of the highly congested "unregulated" bands such as 2.4 GHz. However, when traffic on the WLAN occasionally increases, quality of service may degrade significantly due to that band's congestion. A solution may be to offload a portion of this traffic on an as-required basis to spectrum shared with an overlying ubiquitous coverage wireless network.

Another type of communications system that may benefit from spectrum sharing as described herein may be remote video (and/or audio) feeds such as commonly used by local television news programs for "live" video reporting from remote locations. Typically, such feeds involve the use of a portable remote unit equipped with a directional antenna used to establish a point-to-point link with a fixed antenna located on a tall structure. That fixed antenna in turn is connected through a transceiver and fixed (typically cable or fiber optic) backhaul to broadcast facilities. In many large urban areas access to dedicated spectrum for these links may be problematic. Embodiments thus may also enable sharing of spectrum by such remote video feeds with an overlying broadband network.

Figure 5:
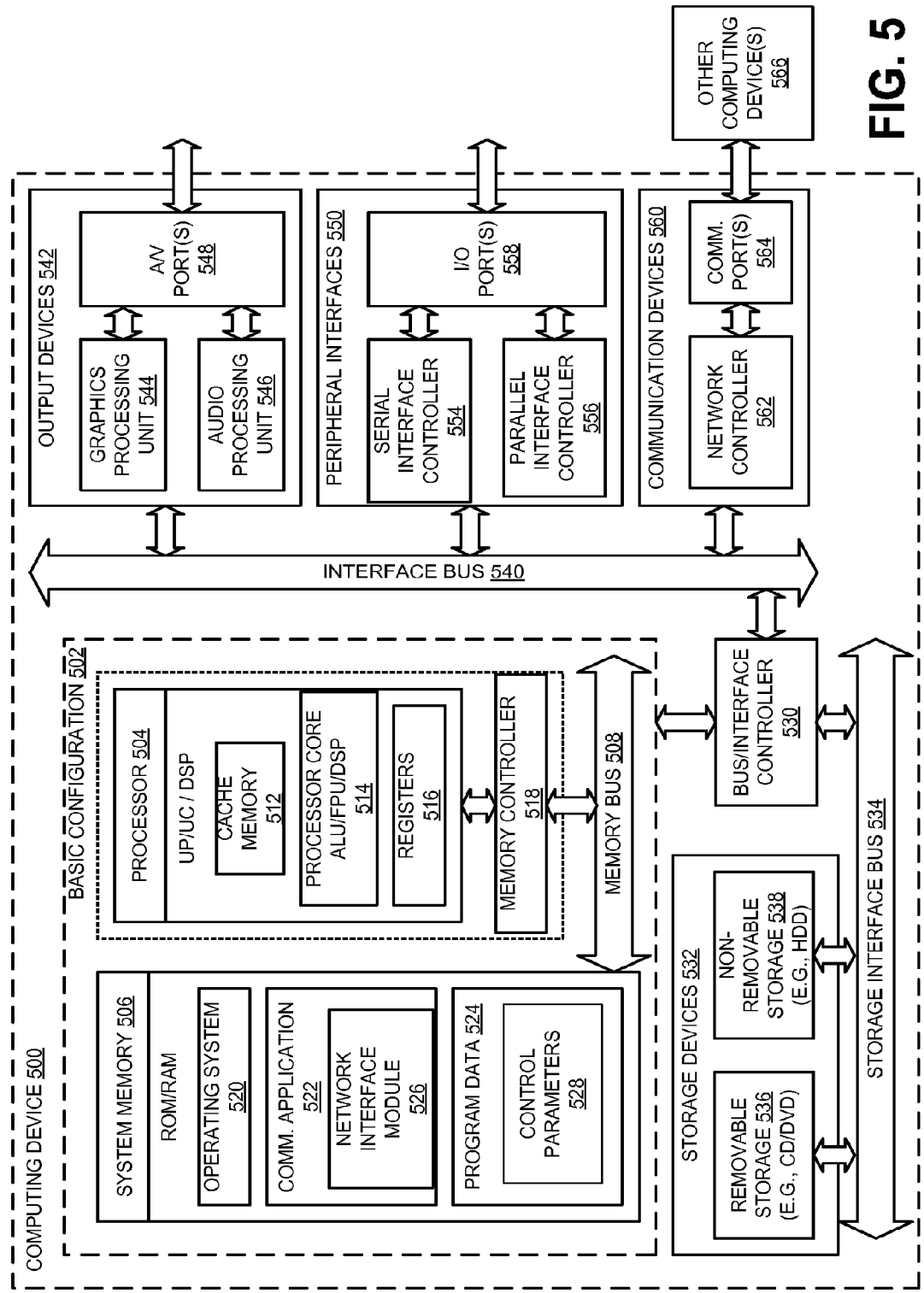
FIG. 5 illustrates a general purpose computing device, which may be used to implement shared spectrum coordination between wireless devices and a wireless network.

FIG. 5 illustrates a general purpose computing device, which may be used to implement shared spectrum coordination between wireless devices and a wireless network, arranged in accordance with at least some embodiments described herein. Computing device 500 may reside within, or may be associated with, a wireless device (for example, within wireless device 75 or 95). In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more communication applications 522, and program data 524. The communication applications 522 may facilitate frequency sharing negotiation with an overlying broadband network, among other things, and include a network interface module 526 (e.g., an interface of the UE), which may communicate with a controller of the overlying network for negotiating use of spectrum for a low power wireless device and/or receiving a frequency assignment as described herein. The program data 524 may include, among other data, control parameters 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include network controller, servers, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for implementing iterative simulation of requirement metrics for assumption and schema-free configuration management in cloud migration. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
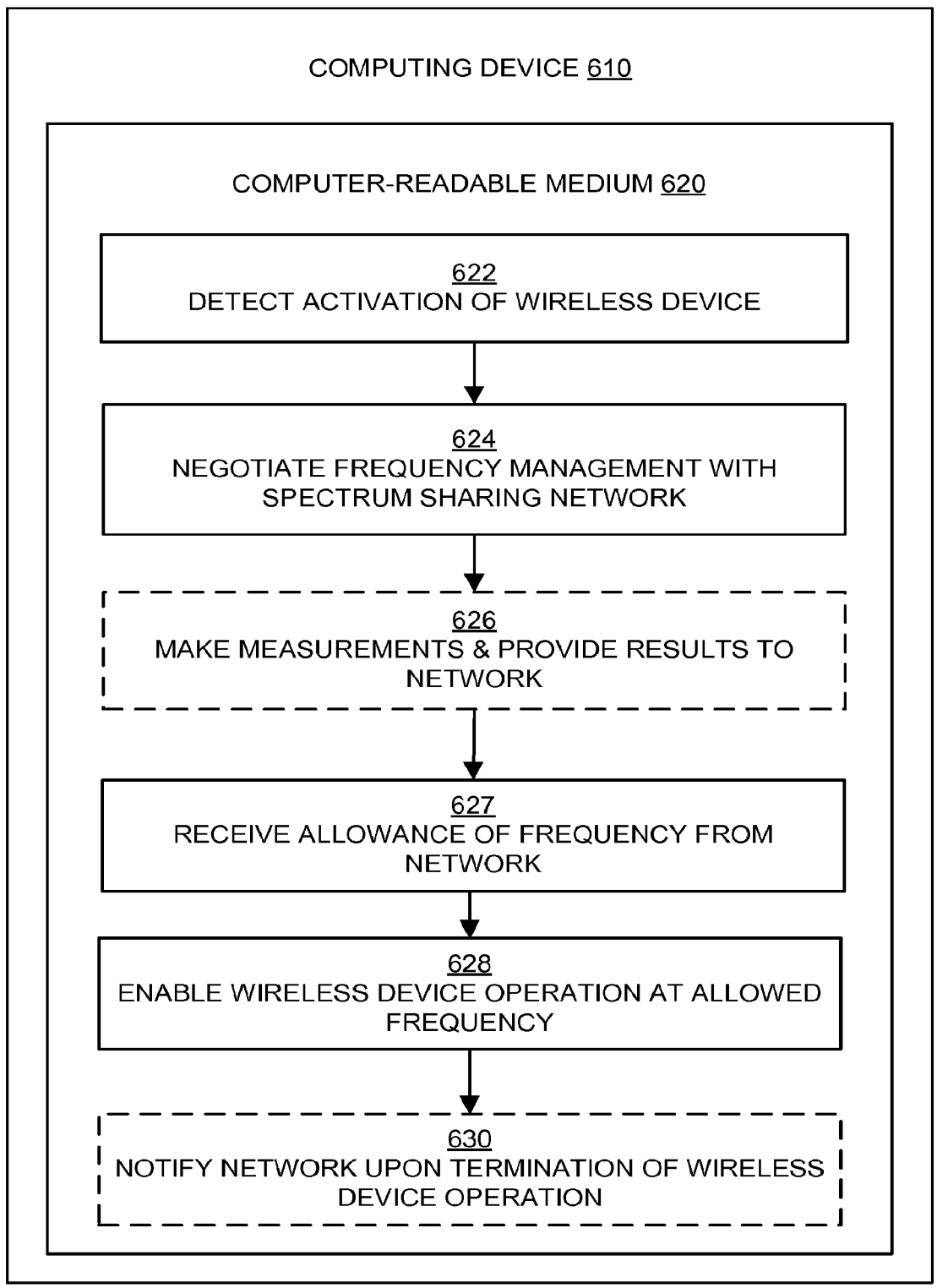
FIG. 6 is a flow diagram illustrating an example method that may be performed by a computing device such as device 500 in FIG. 5.

FIG. 6 is a flow diagram illustrating an example method that may be performed by a computing device such as device 500 in FIG. 5, arranged in accordance with at least some embodiments described herein. Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process for coordinating co-spectrum users with wireless broadband networks may begin with block 622, "DETECT ACTIVATION OF WIRELESS DEVICE", where the intent to use a wireless device on one or more frequencies shared with an overlying network may be detected at the processor controlling a UE such as UE 77 of FIG. 3. Block 622 may be followed by block 624, "NEGOTIATE FREQUENCY MANAGEMENT WITH SPECTRUM SHARING NETWORK," where UE 77 may negotiate with an RRC 125 of the overlying network the use of the shared frequency (ies). For example, if the wireless device operates on a fixed frequency, the UE 77 may request clearing of that frequency by the network, or if the wireless device can operate at multiple frequencies, the UE 77 may ask for designation of one to operate on.

Block 624 may be followed by optional block 626, "MAKE MEASUREMENTS & PROVIDE RESULTS TO NETWORK". At block 626, the network may request from the UE signal level measurements on channels transmitted by certain BTSs in order to determine potential interference relationships and thus a strategy for sharing the spectrum. The UE 77 may perform the measurements and report the results to the RRC 125. Optional block 626 may be followed by block 627, "RECEIVE ALLOWANCE OF FREQUENCY FROM NETWORK", where the wireless network may inform UE 77 that the wireless device is allowed to operate on the cleared frequency or frequencies. The allowance may also include other information such as a period of time for which the allowance is valid. Block 627 may be followed by block 628, "ENABLE WIRELESS DEVICE OPERATION AT ALLOWED FREQUENCY", where the UE 77 may enable the wireless device to operate on the allowed frequency or frequencies.

Block 628 may be followed by optional block 630, "NOTIFY NETWORK UPON TERMINATION OF WIRELESS DEVICE OPERATION," where the UE 77 may notify the network that the wireless device has ceased operations such that the network can resume using the frequency or frequencies without constraint. Alternatively, the frequency clearing, and corresponding allowance of use by the wireless device, may be for a predefined time period, and the network may resume unconstrained use of those frequencies without a termination notification from the UE 77.

The blocks included in the above described process are for illustration purposes. Coordination of co-spectrum users with wireless broadband networks may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 7:
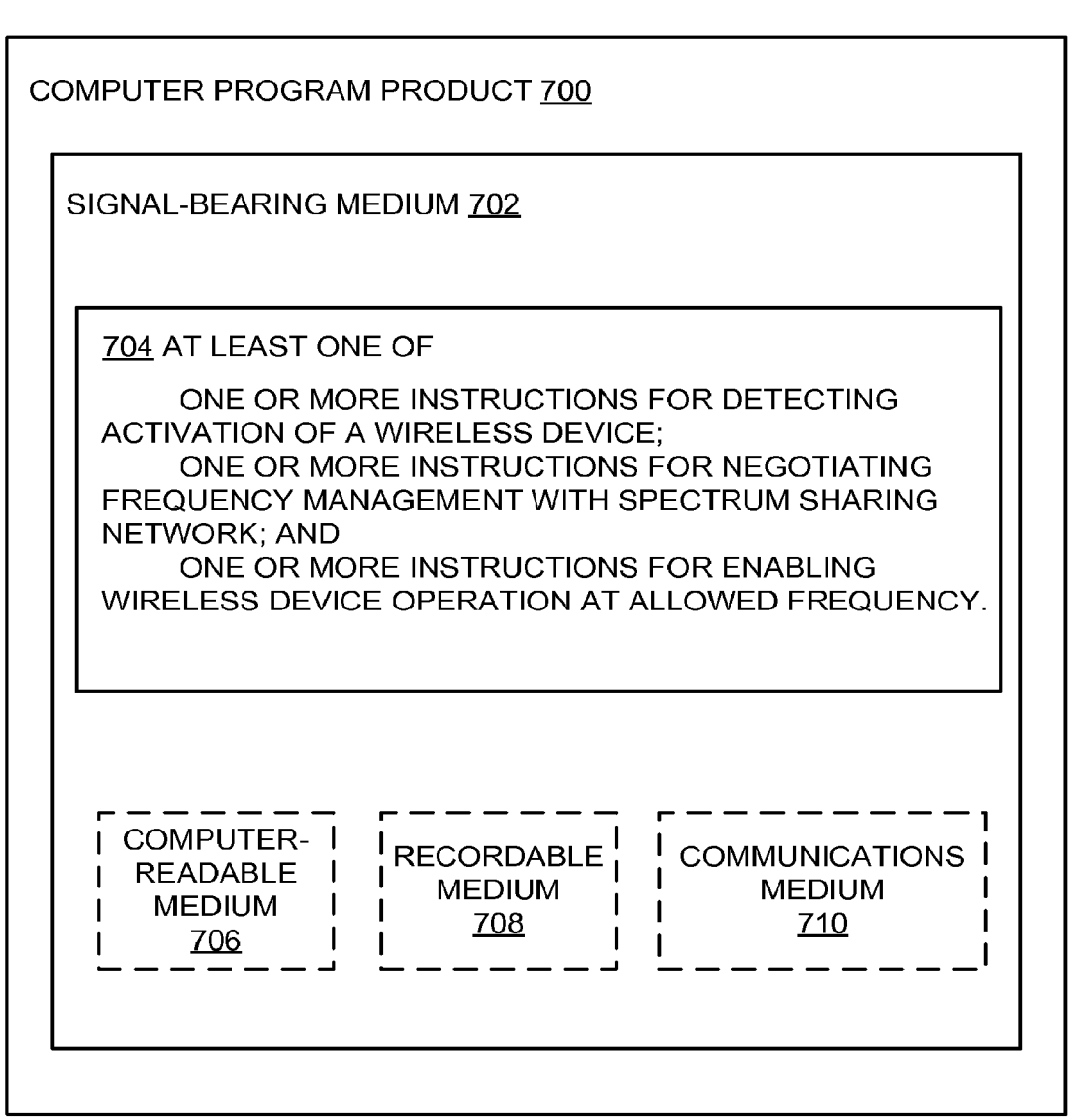
FIG. 7 illustrates a block diagram of an example computer program product, all arranged in accordance with at least some embodiments described herein.
Figure 5:
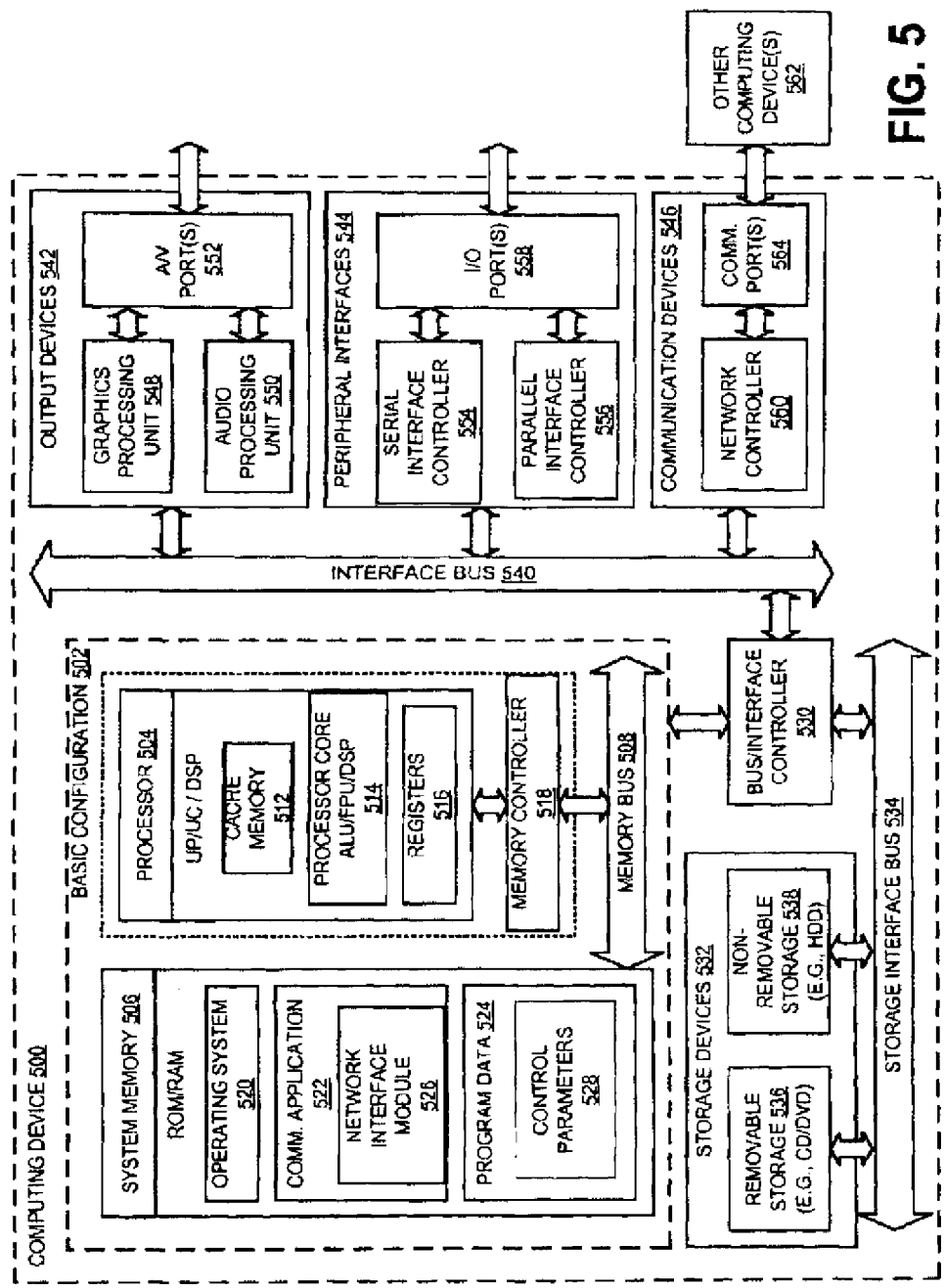

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the interface of the UE may undertake one or more of the tasks shown in FIG. 6 in response to the instructions 704 conveyed to the processor 504 by the medium 702 to perform actions associated with coordinating co-spectrum users with wireless networks as described herein. Some of those instructions may include, for example, instructions for detecting activation of a wireless device, negotiating frequency management with spectrum sharing network, and/or enabling wireless device operation at an allowed frequency according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for coordinating shared wireless spectrum use may include detecting activation of a wireless device configured to operate on a single fixed frequency, a fixed set of frequencies, a single frequency selected from a group of frequencies, or a set of frequencies selected from a group of sets of frequencies, where the single frequency or the set of frequencies is shared by the wireless device and a wireless network. The method may also include negotiating frequency use between the wireless device and the wireless network, and enabling the wireless device to operate using a frequency or frequencies allowed by the wireless network.

According to other examples, the method may further include upon completion of the wireless device operation, notifying the wireless network with a termination message; determining signal levels from one or more base stations of the wireless network in a vicinity of a location of the wireless device; and/or reporting the determined signal levels to the wireless network. Determining signal levels from the one or more base stations may include identifying the one or more base stations.

According to further examples, negotiating frequency use with the wireless network may include reporting to the wireless network a frequency range or list of frequencies on which the wireless device is capable of operating, bandwidth requirements of the wireless device, one or more power levels the wireless device is capable of employing for each operating frequency, and/or maximum interference levels the wireless device is capable of tolerating for each operating frequency. Negotiating frequency use with the wireless network may also include selecting, for operation of the wireless device, a frequency or frequencies allowed by the wireless network; and/or a power level or power levels allowed by the wireless network for the selected operating frequency or frequencies.

According to yet other examples, one or more base stations of the wireless network in a vicinity of a location of the wireless device may be constrained in their use of a frequency or frequencies on which the wireless device is allowed to operate until receiving a termination message at the wireless network or expiration of a predefined period. The method may further include renegotiating frequency use with the wireless network prior to the expiration of the predefined period. The wireless network may be a cellular telecommunication network, a wireless local area network (WLAN), or a wide area network (WAN). The method may also include negotiating frequency management with the wireless network through a network interface module comprising a user equipment (UE) of the wireless network where the UE and the wireless device are integrated.

According to other examples, a computing device capable of coordinating shared wireless spectrum use with a wireless network may include a memory configured to store instructions, and a communication module configured to communicate wirelessly with the wireless network, and a processor coupled to the memory and the communication module. The processor may detect activation of a wireless device configured to operate on a single fixed frequency, a fixed set of frequencies, a single frequency selected from a group of frequencies, and a set of frequencies selected from a group of sets of frequencies, where the single frequency or the set of frequencies is shared by the wireless device and a wireless network. The processor may also negotiate frequency use between the wireless device and the wireless network, and enable the wireless device to operate using a frequency or frequencies allowed by the wireless network.

According to some examples, the processor may further notify the wireless network with a termination message upon completion of the wireless device operation. The processor may also determine signal levels from one or more base stations of the wireless network in a vicinity of a location of the wireless device and report the determined signal levels to the wireless network. The processor may further identify the one or more base stations as part of determining signal levels from the one or more base stations.

According to further examples, the processor may be configured to negotiate frequency use with the wireless network, where such negotiation may include reporting to the wireless network a frequency range or list of frequencies on which the wireless device is capable of operating, bandwidth requirements of the wireless device, one or more power levels the wireless device is capable of employing for each operating frequency, and/or maximum interference levels the wireless device is capable of tolerating for each operating frequency. The negotiation may also include selecting, for operation of the wireless device, a frequency or frequencies allowed by the wireless network; and/or a power level or power levels allowed by the wireless network for the selected operating frequency or frequencies.

According to yet other examples, the processor may also renegotiate frequency use with the wireless network prior to an expiration of a predefined period. The wireless network may be a cellular telecommunication network, a wireless local area network (WLAN), or a wide area network (WAN). The computing device may be a component of a user equipment (UE) of the wireless network, where the UE and the wireless device are integrated.

According to further examples, a computer-readable storage medium may have instructions stored thereon for coordinating shared wireless spectrum use. The instructions may include detecting activation of a wireless device configured to operate on a single fixed frequency, a fixed set of frequencies, a single frequency selected from a group of frequencies, or a set of frequencies selected from a group of sets of frequencies, where the single frequency or the set of frequencies is shared by the wireless device and a wireless network. The instructions may also include negotiating frequency use between the wireless device and the wireless network, and enabling the wireless device to operate using a frequency or frequencies allowed by the wireless network.

According to other examples, the instructions may further include upon completion of the wireless device operation, notifying the wireless network with a termination message; determining signal levels from one or more base stations of the wireless network in a vicinity of a location of the wireless device; and/or reporting the determined signal levels to the wireless network. Determining signal levels from the one or more base stations may include identifying the one or more base stations.

According to further examples, negotiating frequency use with the wireless network may include reporting to the wireless network a frequency range or list of frequencies on which the wireless device is capable of operating, bandwidth requirements of the wireless device, one or more power levels the wireless device is capable of employing for each operating frequency, and/or maximum interference levels the wireless device is capable of tolerating for each operating frequency. Negotiating frequency use with the wireless network may also include selecting, for operation of the wireless device, a frequency or frequencies allowed by the wireless network; and/or a power level or power levels allowed by the wireless network for the selected operating frequency or frequencies.

According to yet other examples, one or more base stations of the wireless network in a vicinity of a location of the wireless device may be constrained in their use of a frequency or frequencies on which the wireless device is allowed to operate until receiving a termination message at the wireless network or expiration of a predefined period. The instructions may further include renegotiating frequency use with the wireless network prior to the expiration of the predefined period. The wireless network may be a cellular telecommunication network, a wireless local area network (WLAN), or a wide area network (WAN). The instructions may also include negotiating frequency management with the wireless network through a network interface module comprising a user equipment (UE) of the wireless network where the UE and the wireless device are integrated.

According to some examples, a wireless communication network coordinating shared wireless spectrum use with non-network wireless devices may include one or more base stations, each base station covering a predefined geographical area; a plurality of user equipment (UE) communicating with the network via at least one base station; and one or more radio resource controllers (RRCs). Each RRC may be configured to receive, from a UE associated with a non-network wireless device configured to operate on a single fixed frequency, a fixed set of frequencies, a single frequency selected from a group of frequencies, or a set of frequencies selected from a group of sets of frequencies, where the single frequency or the set of frequencies may be shared with the wireless network, an indication of activation or intended activation of the non-network wireless device. Each RRC may also negotiate frequency use between the UE and the wireless network, and notify the UE with one or more allowed frequencies or sets of frequencies for the non-network wireless device to operate upon.

According to other examples, the RRC may also control one or more base stations in a vicinity of a location of the non-network wireless device so as to constrain their use of one or more allowed frequencies; control the one or more base stations in the vicinity of the location of the non-network wireless device so as to remove the constraints on frequency use upon one of receipt of a termination message from the UE and expiration of a predefined period; receive from the UE a report of received power levels of signals transmitted by base stations in a proximity of the wireless device; and/or consider the report of the received power levels in determining which frequency or frequencies, if any, to allow the wireless device to operate on. The network may be a cellular telecommunication network, a wireless local area network (WLAN), or a wide area network (WAN).

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to be executed on a computing device to coordinate shared wireless spectrum use, comprising:
    detecting, at a processor of the computing device, activation of a wireless device configured to operate on one of:
        a single fixed frequency,
        a fixed set of frequencies,
        a single frequency selected from a group of frequencies, and
        a set of frequencies selected from a group of sets of frequencies,
    wherein the single frequency or the set of frequencies is shared by the wireless device and a wireless network;
    negotiating frequency management between the wireless device and the wireless network at the processor through a network interface module comprising a user equipment (UE) of the wireless network; and
    enabling the wireless device to operate using a frequency or frequencies allowed by the wireless network at the processor.

2. The method according to claim 1, further comprising:
    determining signal levels from one or more base stations of the wireless network in a vicinity of a location of the wireless device at the processor; and
    reporting the determined signal levels to the wireless network.

3. The method according to claim 2, wherein determining signal levels from the one or more base stations includes identifying the one or more base stations.

4. The method according to claim 1, wherein negotiating frequency management with the wireless network includes:
    reporting to the wireless network at least one from a set of:
        a frequency range or list of frequencies on which the wireless device is capable of operating, bandwidth requirements of the wireless device, one or more power levels the wireless device is capable of employing for each operating frequency, and maximum interference levels the wireless device is capable of tolerating for each operating frequency.

5. The method according to claim 1, wherein negotiating frequency management with the wireless network includes:
    selecting, for operation of the wireless device, at least one from: a frequency or frequencies allowed by the wireless network; and a power level or power levels allowed by the wireless network for the selected operating frequency or frequencies at the processor of the computing device.

6. The method according to claim 1, wherein one or more base stations of the wireless network in a vicinity of a location of the wireless device are constrained in their use of a frequency or frequencies on which the wireless device is allowed to operate until one of: receiving a termination message at the wireless network and expiration of a predefined period.

7. The method according to claim 6, further comprising:
    renegotiating frequency management with the wireless network prior to the expiration of the predefined period.

8. The method according to claim 1, wherein the UE and the wireless device are integrated at the processor of the computing device.

9. A computing device capable of coordinating shared wireless spectrum use with a wireless network, the computing device comprising:
    a memory configured to store instructions;
    a communication module configured to communicate wirelessly with the wireless network; and
    a processor coupled to the memory and the communication module, wherein the processor is configured to:
    detect activation of a wireless device configured to operate on one of:
        a single fixed frequency,
        a fixed set of frequencies,
        a single frequency selected from a group of frequencies, and
        a set of frequencies selected from a group of sets of frequencies,
    wherein the single frequency or the set of frequencies is shared by the wireless device and a wireless network;
    negotiate frequency use between the wireless device and the wireless network; and
    enable the wireless device to operate using a frequency or frequencies allowed by the wireless network, wherein the computing device is a component of a user equipment (UE) of the wireless network.

10. The computing device according to claim 9, wherein the processor is further configured to:
  determine signal levels from one or more base stations of the wireless network in a vicinity of a location of the wireless device; and
  report the determined signal levels to the wireless network, wherein the processor is further configured to identify the one or more base stations as part of determining signal levels from the one or more base stations.

11. The computing device according to claim 9, wherein the processor is configured to negotiate frequency use with the wireless network, and wherein such negotiation includes:
  reporting to the wireless network at least one from a set of:
    a frequency range or list of frequencies on which the wireless device is capable of operating, bandwidth requirements of the wireless device, one or more power levels the wireless device is capable of employing for each operating frequency, and maximum interference levels the wireless device is capable of tolerating for each operating frequency.

12. The computing device according to claim 9, wherein the wireless network is one of: a cellular telecommunication network, a wireless local area network (WLAN), and a wide area network (WAN).

13. The computing device according to claim 9, wherein the UE and the wireless device are integrated.

14. A non-transitory computer-readable storage medium having instructions stored thereon for coordinating shared wireless spectrum use, the instructions comprising:
  detecting activation of a wireless device configured to operate on one of:
    a single fixed frequency,
    a fixed set of frequencies,
    a single frequency selected from a group of frequencies, and
    a set of frequencies selected from a group of sets of frequencies,
  wherein the single frequency or the set of frequencies is shared by the wireless device and a wireless network;
  negotiating frequency management between the wireless device and the wireless network through a network interface module comprising a user equipment (UE) of the wireless network; and
  enabling the wireless device to operate using a frequency or frequencies allowed by the wireless network.

15. The non-transitory computer-readable storage medium according to claim 14, wherein the instructions further comprise:
  upon completion of the wireless device operation, notifying the wireless network with a termination message.

16. A wireless communication network coordinating shared wireless spectrum use with non-network wireless devices, the network comprising:
  one or more base stations, each base station covering a predefined geographical area;
  a plurality of user equipment (UE) communicating with the network via at least one base station; and
  one or more radio resource controllers (RRCs), wherein each RRC is configured to:
  receive, from a UE associated with a non-network wireless device configured to operate on one of:
    a single fixed frequency,
    a fixed set of frequencies,
    a single frequency selected from a group of frequencies, and
    a set of frequencies selected from a group of sets of frequencies,
    wherein the single frequency or the set of frequencies is shared with the wireless network, an indication of activation or intended activation of the non-network wireless device;
  negotiate frequency use between the UE and the wireless network; and
  notify the UE with one or more allowed frequencies or sets of frequencies for the non-network wireless device to operate upon.

17. The network according to claim 16, wherein the RRC is further configured to:
  control one or more base stations in a vicinity of a location of the non-network wireless device so as to constrain their use of one or more allowed frequencies.

18. The network according to claim 17, wherein the RRC is further configured to:
  control the one or more base stations in the vicinity of the location of the non-network wireless device so as to remove the constraints on frequency use upon one of receipt of a termination message from the UE and expiration of a predefined period.

19. The network according to claim 16, wherein the RRC is further configured to:
  receive from the UE a report of received power levels of signals transmitted by base stations in a proximity of the wireless device; and
  consider the report of the received power levels in determining which frequency or frequencies, if any, to allow the wireless device to operate on.

* * * * *

UNITED STATES PATENT AND TRADEMARK OFFICE
CERTIFICATE OF CORRECTION

PATENT NO.         : 8,730,833 B2                                          Page 1 of 2
APPLICATION NO.    : 13/642904
DATED              : May 20, 2014
INVENTOR(S)        : Drucker It is certified that error appears in the above-identified patent and that said Letters Patent is hereby corrected as shown below:

In the Drawings

In the drawing sheet, consisting of Fig. 5, should be deleted to be replaced with the drawing sheet, consisting of Fig. 5, as shown on the attached page.

In the Specification

In Column 3, Line 45, delete "hereof In" and insert -- hereof. In --, therefor.

In Column 19, Line 13, delete "thereof In" and insert -- thereof. In --, therefor.

In Column 19, Line 27, delete "and or" and insert -- and/or --, therefor.

Signed and Sealed this
Ninth Day of September, 2014

Michelle K. Lee
*Deputy Director of the United States Patent and Trademark Office*